Figure 1:
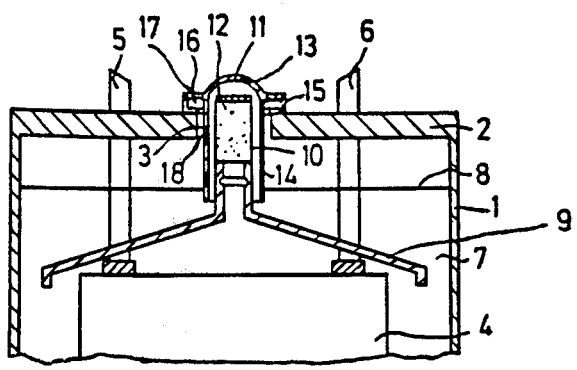

United States Patent [19]

Reber

[11] 4,074,024
[45] Feb. 14, 1978

[54] CATALYST CONTAINING CLOSURE PLUG FOR STORAGE BATTERY AND METHOD OF OPERATING STORAGE BATTERY

[75] Inventor: Harald Reber, Gerlingen, Germany

[73] Assignee: Robert Bosch GmbH, Gerlingen-Schillerhohe, Germany

[21] Appl. No.: 727,937

[22] Filed: Sept. 29, 1976

Related U.S. Application Data

[60] Division of Ser. No. 666,585, March 15, 1976, which is a continuation of Ser. No. 532,866, Dec. 16, 1974, abandoned.

[30] Foreign Application Priority Data

Feb. 22, 1974 Germany .............................. 2408556

[51] Int. Cl.$^2$ ............................................. H01M 2/12
[52] U.S. Cl. .................................................... 429/86
[58] Field of Search .......................................... 429/86

[56] References Cited

U.S. PATENT DOCUMENTS 3,832,238   8/1974   Marui et al. ............................. 429/86

FOREIGN PATENT DOCUMENTS 38-3368   4/1938   Japan ....................................... 429/86
2,727 of   1909   United Kingdom .................... 429/86

Primary Examiner—John H. Mack
Assistant Examiner—H. A. Feeley
Attorney, Agent, or Firm—Flynn & Frishauf

[57] ABSTRACT

A closure plug containing a recombination catalyst is adapted to fit into an opening of a battery. It contains means for directing evolved oxygen and hydrogen gases to the recombination catalyst and also contains gas communication means to conduct the recombined water vapor below the surface of the electrolyte where it is condensed. The method is directed to operating a battery wherein gaseous oxygen and hydrogen are recombined to form water vapor in the upper portion of the battery and the recombined water vapor is then conducted through a conduit extending into the electrolyte wherein it is condensed.

4 Claims, 2 Drawing Figures

CATALYST CONTAINING CLOSURE PLUG FOR STORAGE BATTERY AND METHOD OF OPERATING STORAGE BATTERY

This is a division of application Ser. No. 666,585, filed Mar. 15, 1976, which is a continuation of Ser. No. 532,866, filed Dec. 16, 1974, now abandoned.

The present invention relates to storage batteries that is, secondary batteries, and more particularly to such batteries which have a built-in catalyst to recombine hydrogen and oxygen liberated by the battery, the catalyst being located in, or adjacent to the closure plug of the battery.

Hydrogen and oxygen are generated upon charging of secondary batteries, and particularly upon overcharging of the batteries, by dissociation of water. If the gases are present in stoichiometric proportion, a catalyst can be located in the stream or flow of the gases to effect recombination of the gases to result in water. Thus, a portion of the water, the loss of which, otherwise, would be irreversible, can be recycled.

Recombination catalysts of this type have previously been located in the stoppers or plugs which close the cells of the storage batteries, or located adjacent thereto, or generally in the upper portion of the respective cells of the battery.

In operation, the catalyst becomes warm. A temperature of over 100° C can readily result upon recombination of hydrogen and oxygen when the battery is being charged or in operation. The resulting recombined water then will be in the form of steam, or water vapor and will escape from the battery. The intended result — to recycle the recombined water — is thus not achieved. In order to avoid such loss, it has previously been proposed to control the charge current to the battery in such a manner that the battery does not exceed a temperature of 100° C, by sensing battery temperature (for example by means of an electrical thermal sensitive element) which provides the appropriate sensing signal for battery charge control. This system requires a good many components, and is hence expensive, and thus has not found commercial favor.

It is an object of the present invention to provide an arrangement or system to permit recycling of recombined water — from liberated hydrogen and oxygen — which permits recycling of a high proportion of water being formed, without requiring expensive components and, preferably, which can be adapted to existing batteries without needing special apparatus or equipment. Preferably, the system should permit replacement of a customary closure plug, in a commercial battery, by the system or arrangement of the present invention, thus making continuous checking of the state of the electrolyte of the battery unnecessary. Further, the system or arrangement should not require service, so that it can be used with low maintenance or service-free batteries, that is, with batteries in which a closure plug is sealed into the fill opening for the battery so as to be essentially non-removable.

SUBJECT MATTER OF THE PRESENT INVENTION

Briefly, the closure plug of the battery is so formed that a space is provided behind — with reference to gas flow of hydrogen and oxygen from the electrolyte — the catalyst which is in direct fluid flow communication with the electrolyte. The chamber and the fluid flow communication then permit water vapor which is generated as the temperature of the catalyst increases is to condense by contact with the electrolytes of the battery, and thus to recycle to the electrolyte, so that the electrolyte level of the battery remains effectively constant.

If the closure plug in accordance with the invention is to be used for a service or maintenance-free battery, then the plug is formed as a pressure stopper which is pressed into the battery after filling the battery with electrolyte. The plug is inserted into the battery cover in such a manner that it cannot readily be removed without use of special tools. If the closure plug, in accordance with the present invention, is to be used with a customary battery in which the plug is removable — by a screw thread or by a pressure snap fit — then the plug in accordance with the invention is formed with a suitable screw thread — or a snap surface — so that it can be placed in the battery as a replacement element for the customary plug with the customary outer shape — depending on the type of the battery. The maintenance or service intervals of the thus refitted battery is substantially increased.

Figure 2:
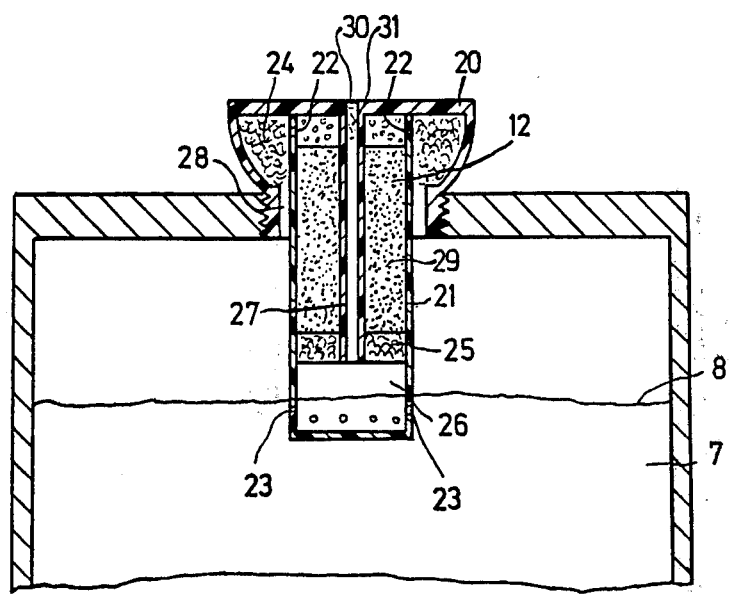

The invention will be described by way of example with reference to the accompanying drawings, wherein:

FIG. 1 is a fragmentary cross-sectional view through the cell of a battery having a closure plug in accordance with the invention which is fitted into the cell, the cell of the battery and the closure plug being matched to each other; and FIG. 2 is a cross-sectional view, to an enlarged scale, of a closure plug with an outer screw thread which can be used as a replacement plug in a customary battery.

The battery housing 1 (FIG. 1) is closed off by a top cover 2 formed with a fill opening 3. Battery plates 4, with contact terminals 5 and 6, are located within the housing 1. The housing 1 further retains the electrolyte 7, the upper level of which is indicated by the line 8. A collecting bell 9 is located above plates 4, shaped to fit over the plates. A catalyst container 10 is located on bell 9, above level 8 of the electrolyte. The upper end of the catalyst container 10 is closed off by a porous layer 11. A recombination catalyst 12 is located within the catalyst container 10. The recombination 12, as such, is known; it may contain, for example, aluminum oxide, or aluminum silicate, the surface of which is coated with a thin layer of platinum or palladium. The catalyst is rendered hydrophobic in known manner, for example by being coated with a thin porous layer of PTFE(-polytetrafluorethylene). A tube 13, for example made of plastic and closed off at one end, is placed over the catalyst container 10. The wall 14 of tube 13 extends below the electrolyte level 8. Tube 13 is formed with a lateral projection 15 which seats on the cover 2 of the battery. A further recombination catalyst 16 is located in the chamber formed by the lateral projection 15. The recombination catalyst 16 may be similar to that of the catalyst 12. The lateral projection 15 is closed off towards the outside by a hydrophobic porous membrane 17 which, for example, may consist of PTFE.

Operation: Hydrogen and oxygen gases which rise from the electrolyte are collected in the collecting bell 9 and flow through the recombination catalyst 12, which recombines the gases to water. A portion of the water which is thus formed is liquid and drips directly into the electrolyte 7 from the catalyst container 10. As the recombination catalyst 12 becomes warm, however, the vapor or steam portion of the water becomes greater and greater. This vapor or steam portion passes through the porous layer 11 and is conducted over the channel or duct formed by the wall 14 and the catalyst container 10 directly back to the electrolyte 7 where the water vapor and steam may condense. The cell is vented by duct 18 which communicates with the recombination catalyst 16 and the hydrophobic porous membrane 17. The recombination catalyst 16 is provided to recombine excess hydrogen. Such excess hydrogen is particularly formed in lead batteries which contain antimony, when the batteries are stored while discharged, due to the formation of local deposits at the negative plates. Oxygen necessary to form water from the thus generated hydrogen is taken from the air by diffusion through the hydrophobic porous membrane 17.

The hydrogen and oxygen gases which arise upon charging of the battery are practically completely recombined and, likewise, the resulting water in liquid or vapor phase, is practically completely recycled to the battery electrolyte.

The structure of FIG. 2 illustrates a stopper or plug which may be used as a replacement plug in exchange for the customary closure plugs of commercial batteries. The top cover 20 of the plug is of plastic. A catalyst container 21, likewise of plastic, is secured to the top cover, for example by an integral molding. The catalyst container 21 is formed with openings 22 at the upper end thereof to permit entry of gases into the catalyst space from above; at the lower end, openings 23 are formed which are located below the electrolyte level 8 to return recombined water to the electrolyte. A mass of filter material 24 is located in the upper portion of the plug beneath top cover 20 thereof. This filter material may, for example, be glass wool, and is provided to keep any acid which might be carried along by the gases away from the catalyst. A glass wool filter 25 spaces the lower end of the catalyst 21 from the top level 8 of the electrolyte, and forms a terminal closure, or surface for the catalyst. A space or chamber 26 is thus formed between the upper level 8 of the electrolyte and the lower surface of the glass wool filter 25. Recycled, returned recombined water flow through this chamber. This chamber 26 is also used to provide a vent to ambient atmosphere for pressure equalization through tube 27 formed centrally in the plug.

Operation: Gases generated by the electrolyte are collected in the top or gas space above the level 8 of the electrolyte, and beneath the top cover of the housing of the battery. A gap 28, adjacent the electrolyte holder 22, permits the gases to flow upwardly into the hollow space of the plug, and through the filter 24, and then through openings 22 into the catalyst container 21; the gases are then recombined in the recombination catalyst 29 to form water. The flow is downwardly; this has the advantage that initially, when the catalyst temperature is low, flow through the catalyst is downwardly. Water and any vapor are thus carried through the catalyst zone in a downward direction. The recombined water then can drip through the glass wool filter 25 into the chamber 26 in which any water vapor which may have formed condenses upon contact with the cold electrolyte 7.

Any excess hydrogen can be converted to water by locating a catalyst 31 in the upper portion of the vent tube 27; this catalyst may, for example, be applied to a plug of fibrous material such as glass wool or asbestos, which is rendered hydrophobic by any known method. This recombination catalyst, loosely introduced in the upper end of tube 27, is protected from the outside ambient temperature by closing the vent tube 27 in the top cover 20 of the plug with a disk 30 of hydrophobic porous membrane material, similar to the material of the membrane 17 in the embodiment of FIG. 1.

The outer side of the plug may be threaded, as shown in FIG. 2, or shaped in suitable manner to seat in the matching opening of the battery, for example by a slight interference fit which resiliently snaps into a battery opening.

Various changes and modifications may be made within the scope of the inventive concept.

I claim:

1. Closure plug for a storage battery comprising:
   a body member adapted to fit into an opening of a battery and having means defining a chamber within the body which is adapted to extend below the liquid level of an electrolyte in a battery, said chamber having at least one opening below the liquid level of the electrolyte to permit a portion of the electrolyte to enter a portion of said chamber;
   means defining an upper enclosure in said chamber of said body, said upper enclosure containing a catalyst for recombining evolved hydrogen and oxygen gases from said battery to form water vapor;
   directing means in communication with said chamber and at least adjacent said chamber for directing said evolved oxygen and hydrogen gases to said upper enclosure;
   a closed non-vented water vapor communication means at least partially defined by said chamber defining means and extending into said electrolyte, said communication means being at least partially located at the end of said body at a level below said upper enclosure to provide a closed conduit to conduct all of the water vapor from said upper enclosure to the portion of said body member which extends below said surface of said electrolyte to bring all of said water vapor into contact with said electrolyte in said chamber to condense said water vapor and intermix condensed with vapor with.

2. Closure plug according to claim 1 wherein said directing means comprises a channel formed around said chamber defining means of said body of said closure plug and adjacent said upper enclosure.

3. Closure plug according to claim 2 further comprising a conduit means extending generally centrally of said upper enclosure and passing substantially vertically through said upper enclosure and out of communication of said upper enclosure; a second recombination catalyst located in the upper portion of said conduit means for combining hydrogen evolved from said electrolyte with oxygen from the atmosphere to form water vapor; and a porous hydrophobic plastic membrane closing off the upper portion of said conduit to the atmosphere and permitting oxygen from said atmosphere to pass into said conduit.

4. Closure plug according to claim 3 further comprising filtering means in a portion of said directing means.

* * * * *

UNITED STATES PATENT OFFICE
CERTIFICATE OF CORRECTION

Patent No. 4,074,024   Dated February 14, 1978

Inventor(s) Harald REBER

It is certified that error appears in the above-identified patent and that said Letters Patent are hereby corrected as shown below:

Column 4, lines 45 and 46, replace "with vapor with" with --water vapor with said electrolyte in said chamber--.

Signed and Sealed this

Twenty-seventh Day of June 1978

[SEAL]

Attest:

RUTH C. MASON
Attesting Officer

DONALD W. BANNER
Commissioner of Patents and Trademarks